(12) United States Patent
Minadeo et al.

(10) Patent No.: US 9,249,782 B2
(45) Date of Patent: Feb. 2, 2016

(54) SNAP RING RETENTION ASSEMBLY FOR A MAIN SHAFT IN A WIND TURBINE

(75) Inventors: Adam Daniel Minadeo, Greenville, SC (US); Scott Denton Thomason, Greer, SC (US); Fabian P. Nunez, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 1015 days.

(21) Appl. No.: 13/362,328

(22) Filed: Jan. 31, 2012

(65) Prior Publication Data

US 2013/0195666 A1  Aug. 1, 2013

(51) Int. Cl.
*F03D 11/00* (2006.01)
*F16C 35/063* (2006.01)

(52) U.S. Cl.
CPC ......... *F03D 11/0008* (2013.01); *F05B 2240/60* (2013.01); *F05B 2260/30* (2013.01); *Y02E 10/722* (2013.01)

(58) Field of Classification Search
CPC ............ F03D 11/0008; F03D 11/0075; F05B 2260/30; F05D 2240/52; F16C 35/063; F16C 35/07
USPC ........ 415/216.1, 229; 416/174, 204 R, 244 R
See application file for complete search history.

(56) References Cited

U.S. PATENT DOCUMENTS

| | | | |
|---|---|---|---|
| 2,897,022 A | 7/1959 | Americo | |
| 3,193,338 A | 7/1965 | Weidmann | |
| 3,214,204 A | 10/1965 | Carter | |
| 3,912,345 A | 10/1975 | Overton | |
| 4,274,807 A * | 6/1981 | Kenney | 416/48 |
| 4,497,612 A * | 2/1985 | Knorowski et al. | 416/198 A |
| 4,806,028 A | 2/1989 | Miller et al. | |
| 5,060,750 A | 10/1991 | Klages | |
| 5,484,242 A | 1/1996 | Meyer | |
| 5,647,686 A | 7/1997 | Hancock et al. | |
| 5,746,517 A | 5/1998 | Durham et al. | |
| 7,285,052 B1 * | 10/2007 | Rowell et al. | 464/7 |
| 7,410,442 B2 * | 8/2008 | Fox | 475/343 |
| 2004/0028504 A1 | 2/2004 | Jakubowski et al. | |
| 2006/0222280 A1 | 10/2006 | Harada et al. | |
| 2011/0243754 A1 | 10/2011 | Luneau et al. | |

FOREIGN PATENT DOCUMENTS

| | | |
|---|---|---|
| EP | 0692642 A2 | 1/1996 |
| GB | 1260523 A | 1/1972 |
| GB | 1335799 A | 10/1973 |
| WO | 02073054 A1 | 9/2002 |

OTHER PUBLICATIONS

Search Report issued in connection with Danish Patent Application No. PA201370023 dated Sep. 18, 2014.

* cited by examiner

*Primary Examiner* — Sean J Younger
(74) *Attorney, Agent, or Firm* — Dority & Manning, P.A.

(57) ABSTRACT

A retention assembly for securing a main rotor shaft in a wind turbine relative to a pillow block is provided. A main rotor shaft extends through a pillow block, and a ring groove is defined in an outer circumferential surface of the main rotor shaft axially offset from the pillow block. A snap ring is engaged within the ring groove, wherein the snap ring and ring groove are designed to achieve a design axial load capacity.

8 Claims, 7 Drawing Sheets

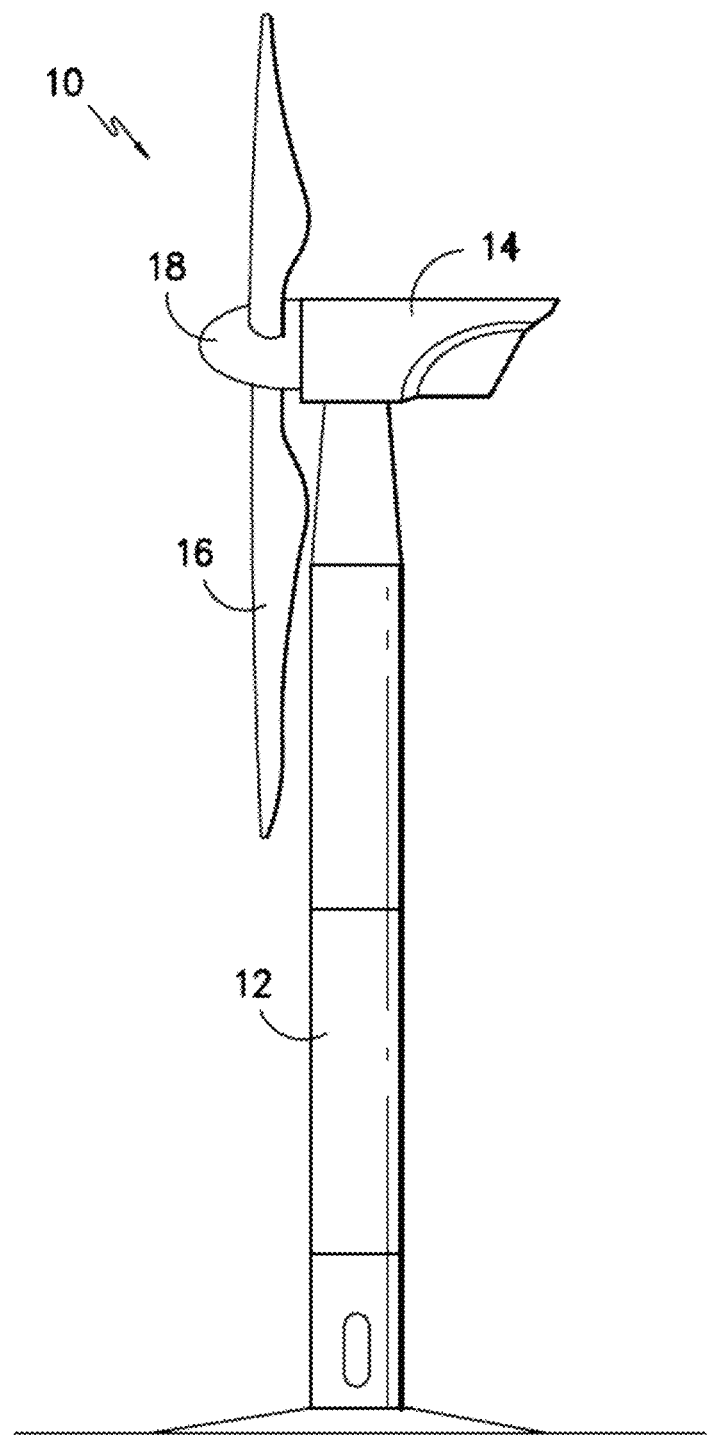
FIG. -1-
PRIOR ART

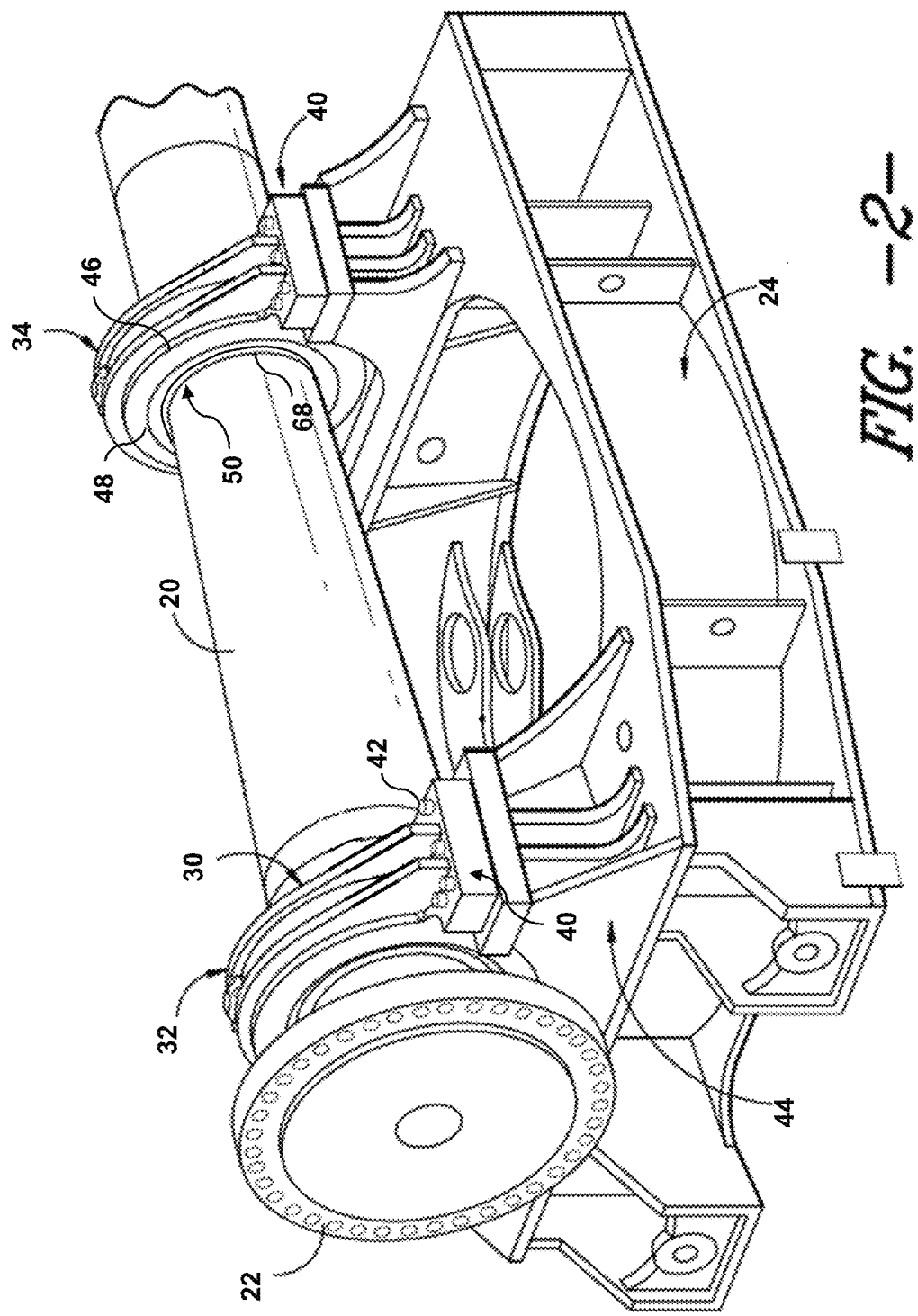

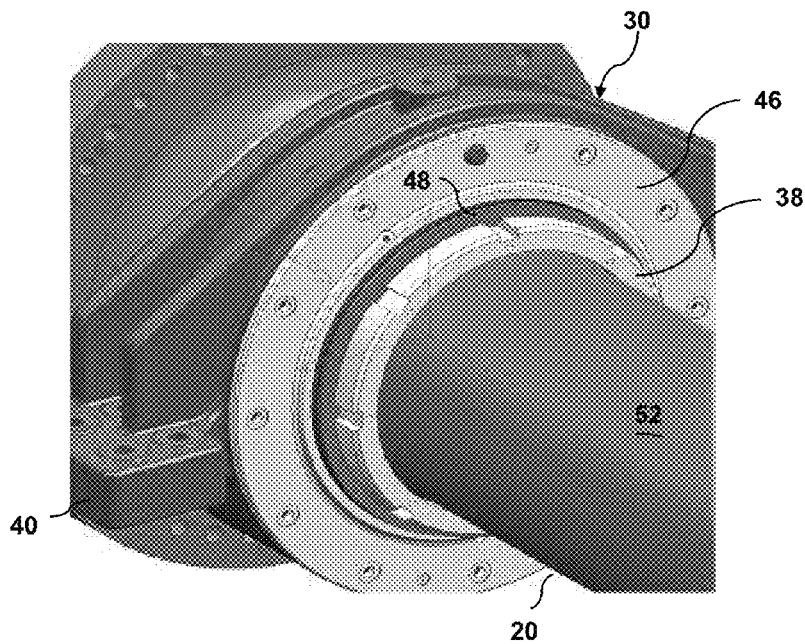
*FIG. -3-*
Prior Art
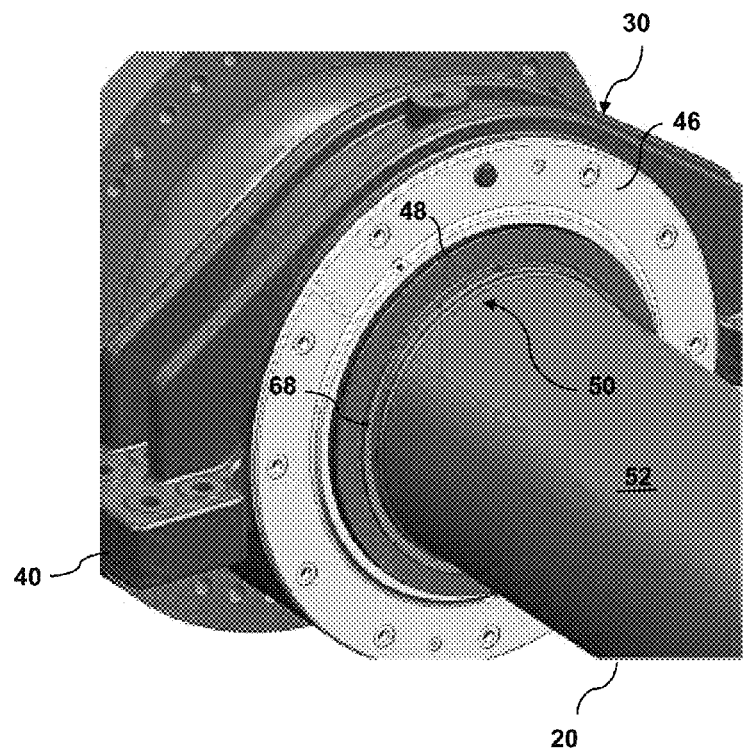
*FIG. -4-*

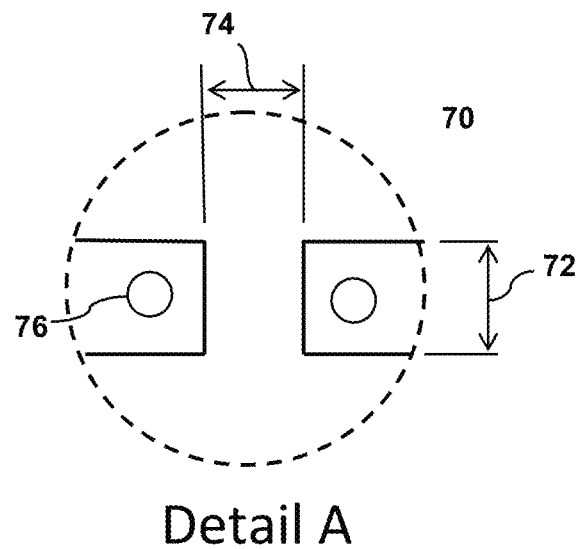
Detail A
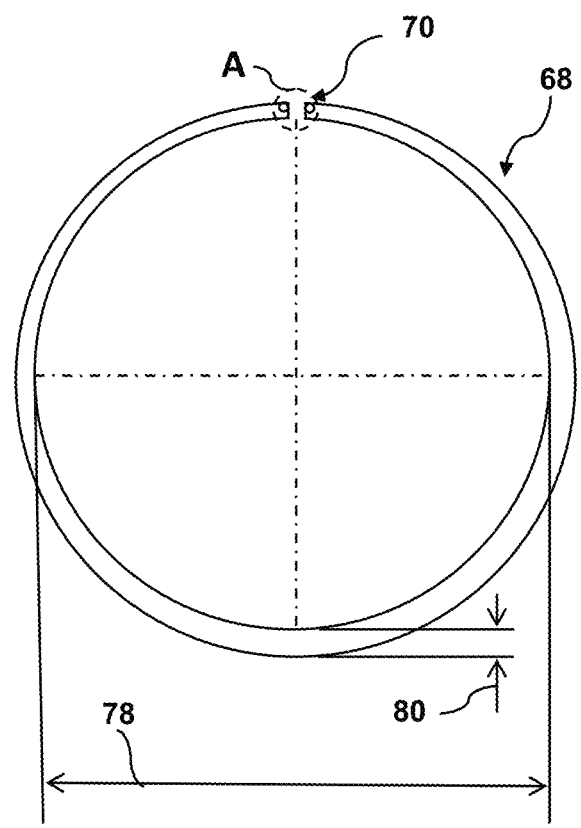
FIG. -5-

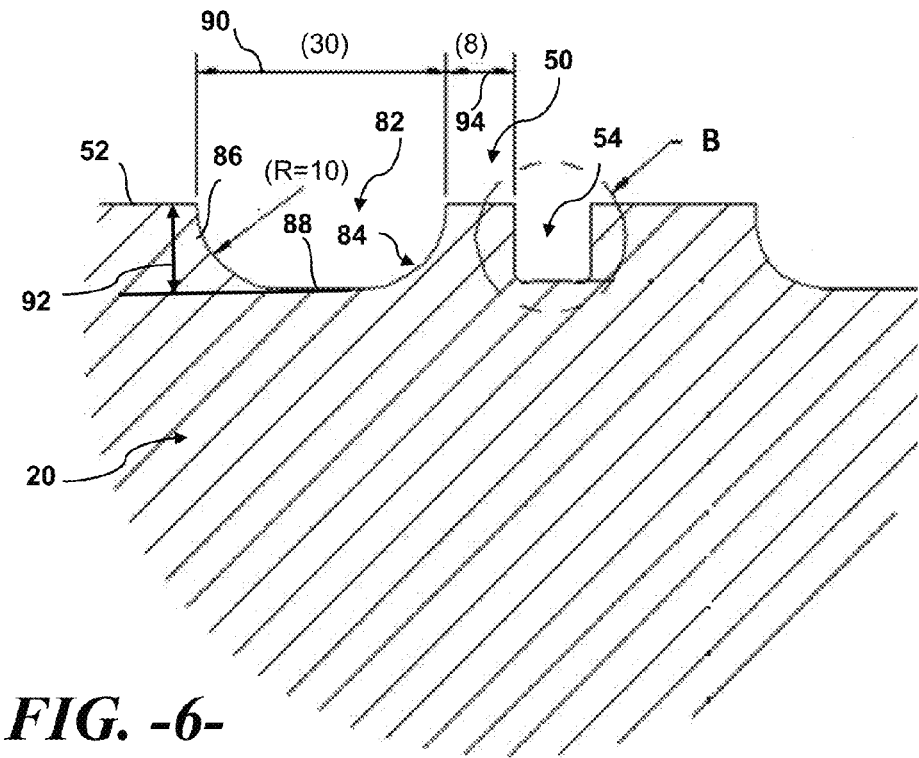
*FIG. -6-*
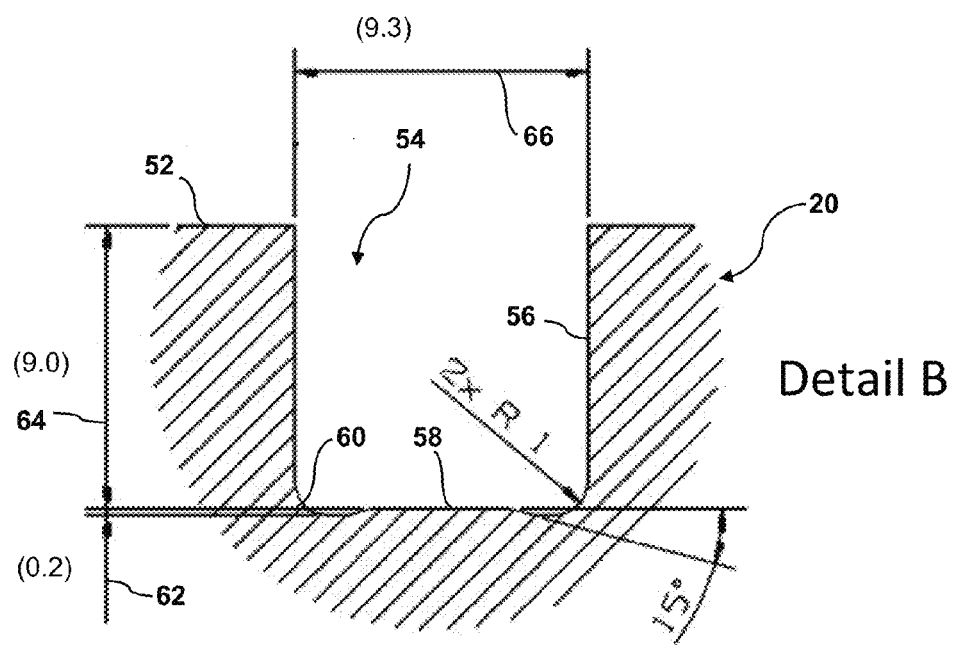
Detail B

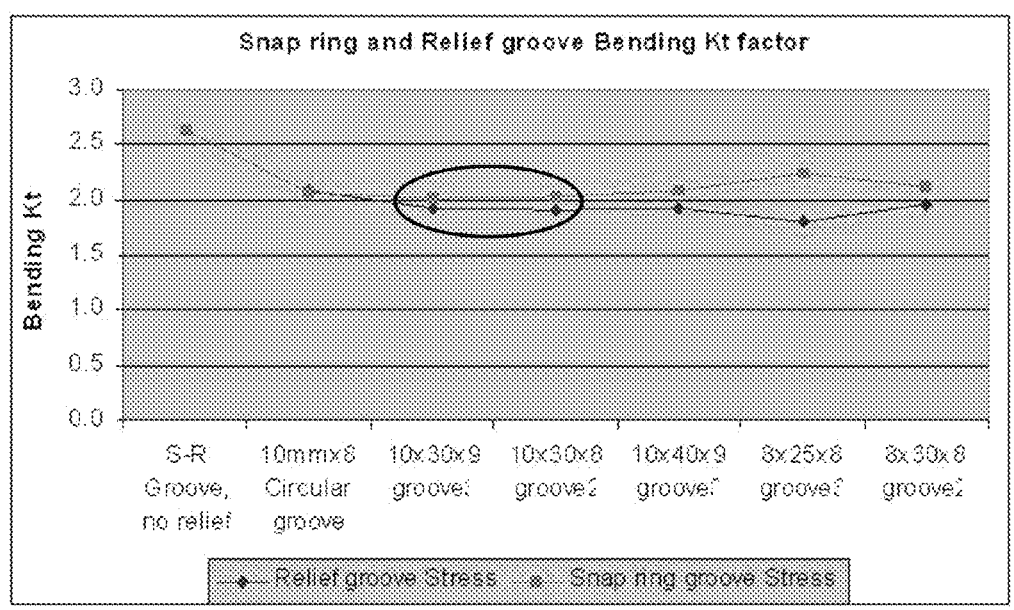
FIG. -7-

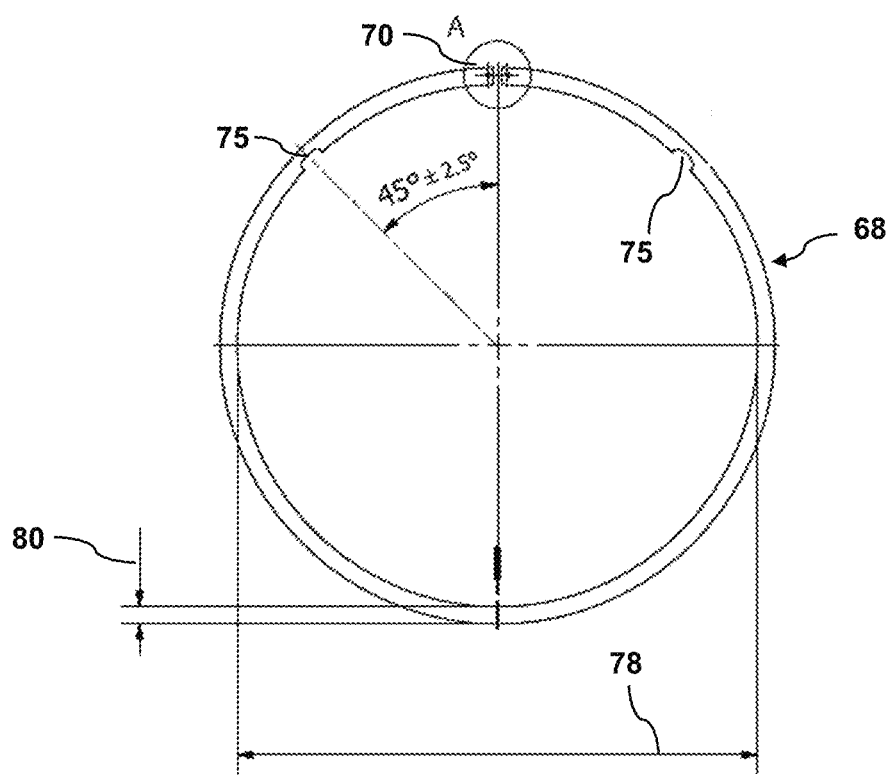
FIG. -8-

SNAP RING RETENTION ASSEMBLY FOR A MAIN SHAFT IN A WIND TURBINE

FIELD OF THE INVENTION

The subject matter disclosed herein relates generally to wind turbines, and more particularly to an assembly for retaining the main shaft of the wind turbine relative to a pillow block.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

Various components of the wind turbine that are disposed in the nacelle must be supported. Thus, a bed plate is provided in the nacelle to support, for example, the shaft and, optionally, the gearbox if present, and the generator. In particular, the shaft must be supported as it extends from the rotor blades and the hub to the gearbox and/or generator. Typical prior art devices for supporting the shafts include pillow blocks. For example, in a typical configuration, the main rotor shaft is pressed fit and held in place in the main bearing housing with a relatively tight fitting inner ring. A locknut is provided as a separate, backup retention device and is engaged with threads defined in the main rotor shaft.

For example, referring to FIG. 3, a prior art configuration is illustrated for retaining the main bearing around rotor shaft 20 in position relative to the pillow block 30. With this configuration, a lock nut 38 is threaded onto threads defined in the outer circumferential surface of the shaft 20, with the lock nut 38 advancing axially so as to engage against an inner ring 48. The main bearing is pressed onto the main shaft 20 and is housed by the pillowblock. The lock nut 38 configuration serves primarily as a secondary or backup retention means.

The threaded locknut assembly can, however, be disadvantageous. For example, the costs and time associated with machining the threads on the main rotor shaft can be significant. An annual inspection of the locknut requires manual loosening and re-tightening of the nut with a spanner wrench, which is cumbersome to use and has resulted in injury to technicians due to the high torque required to adequately tighten the locknut to design specifications.

Thus, an improved retention assembly that eliminates at least certain of the drawbacks of the conventional locknut assembly would be an advantageous advancement in the industry.

BRIEF DESCRIPTION OF THE INVENTION

Aspects and advantages of the invention will be set forth in part in the following description, or may be obvious from the description, or may be learned through practice of the invention.

In accordance with certain embodiments of the present invention, a retention assembly is provided for securing a main rotor shaft in a wind turbine relative to a pillow block. The assembly includes a main rotor shaft that extends through a pillow block in the wind turbine drivetrain. A ring groove is defined in an outer circumferential surface of the main rotor shaft and is axially offset from the pillow block. A snap ring is engaged within the ring groove, wherein the snap ring and corresponding ring groove are designed to achieve a design axial load capacity sufficient for a backup retention means of the rotor shaft without a locknut assembly.

In a further embodiment, a relief groove is defined in the outer circumferential surface of the main rotor shaft and is axially offset from the ring groove. The relief groove has a radial depth and is defined at an axial distance from the ring groove so as to reduce stresses at the ring groove, desirably below stresses at the relief groove.

The relief groove may be designed with various characteristics. For example, the radial depth of the relief groove may be greater than the radial depth of the ring groove. In another embodiment, the relief groove may have side walls and a flat bottom in the axial direction of the main rotor shaft. The side walls may, in a particular embodiment, be defined as rounded shoulder fillets that extend from the flat bottom to the outer circumferential surface of the main rotor shaft.

The relief groove may be designed to achieve particular stress relief values. For example, in one embodiment, the relief groove may have a radial depth of 10 mm, with the rounded shoulder fillets having a radius (R) of 10 mm. The relief groove may be axially spaced from the ring groove of distance from 8 mm to 10 mm. It should be appreciated that the depth, length, and distance of the relief groove relate to the size of the ring groove, and that various dimensional variants are within the scope and spirit of the invention.

The ring groove may also be variously defined. For example, the ring groove may have side walls and a flat bottom in the axial direction of the main rotor shaft, as well as rounded corners defined between the side walls and flat bottom with a radius such that the flat bottom is raised above the corners.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a perspective view of a conventional wind turbine;

FIG. 2 is a perspective view of a bed plate, pillow blocks, main shaft, and retention assembly according to an embodiment of the present disclosure;

FIG. 3 is a perspective view of a conventional locknut retention assembly;

FIG. 4 is a perspective view of an embodiment of a snap ring retention assembly in accordance with aspects of the invention;

FIG. 5 is a front view of a snap ring with a detail drawing of the separation end of the snap ring;

FIG. 6 is a cross-sectional view of a main rotor shaft with details of the snap ring groove and relief groove;

FIG. 7 is a graph of relief groove and ring groove bending stresses for various dimensions of the respective grooves; and FIG. 8 is a front view of an alternate embodiment of a snap ring.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 illustrates a wind turbine 10 of conventional construction. The wind turbine 10 includes a tower 12 with a nacelle 14 mounted thereon. A plurality of rotor blades 16 are mounted to a rotor hub 18, which is in turn connected to a main flange that turns a main rotor shaft, as discussed below. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

FIG. 2 illustrates certain drivetrain components of the wind turbine 10 housed within the nacelle 14. In particular, a main rotor shaft 20 includes a flange 22 for mounting the hub 18 thereon. The shaft 20 is operably connected to a generator (not shown). The shaft 20 in some embodiments may be a direct-drive shaft 20. In these embodiments, the shaft 20 is directly connected to the generator. Alternatively, a gearbox (not shown) may be disposed between the shaft 20 and the generator, and may provide the operable connection between the shaft 20 and the generator. Rotation of the rotor blades 16 is transmitted through the hub 18 to the shaft 20, and from the shaft 20 to the generator.

A bed plate 24 is provided to support the shaft 20, as shown in FIG. 2. In general, the bed plate 24 is a frame disposed in the nacelle 14. The bed plate 24 also supports other components of the wind turbine 10, such as the generator and/or, if present, the gearbox.

The bed plate 24 may include one or more pillow blocks 30 for accommodating and supporting the shaft 20. In one embodiment as shown in FIG. 2, the bed plate 24 includes a forward pillow block 32 adjacent to the hub 18 and an aft pillow block 34 distal from the hub 18. The pillow blocks 32, 34 are mounted to the bed plate 24 via mountings 40, fasteners 42, and pedestals 44.

Still referring to FIG. 2, a retention assembly 50 in accordance with aspects of the present invention is illustrated for securing the position of the main rotor shaft 20 relative to the aft pillow block 34. It should be appreciated that the retention assembly 50 may be utilized with any pillow block 30 along the main rotor shaft 20, and is not limited to any particular pillow block.

Referring to FIGS. 2 and 4, the illustrated embodiment of the retention assembly 50 includes a ring groove 54 (FIG. 6) defined in the outer circumferential surface 52 of the rotor shaft 20. The ring groove 54 is axially offset from the pillow block 30. A snap ring 68 is engaged within the ring groove 54. The snap ring 68 and ring groove 54 are designed to achieve a design axial load capacity sufficient for acting as a backup retention means for the shaft 20 without the disadvantages and complexity of the locknut assembly 38 depicted in the prior art configuration of FIG. 3.

The snap ring 68 is depicted in greater detail in FIG. 5 (including the Detail A drawing). The snap ring 68 is of conventional configuration and has a diameter 78 that corresponds essentially to the diameter of the main rotor shaft 20. The snap ring 68 has an open or release end 70 wherein the ring 68 is discontinuous and separated by a space 74. The ends of the snap ring 68 at the release end 70 have a generally decreased radial dimension 72 as compared to a maximum radial dimension 80 directly opposite from the release end 70. As is understood, this decreasing radial profile characteristic allows the snap ring to be engaged and disengaged from within a respective snap ring groove 54 by a suitable release tool that engages within holes 76 in the ends of the snap ring 68 at the separation end 70 in order to open and spread the snap ring 68 for engagement and disengagement around the shaft 20.

In an alternate embodiment depicted in FIG. 8, the snap ring 68 has a constant radial dimension 72 around the circumference thereof. Cutouts 75 are defined at various locations (for example at about 45° on either side of the release end 70) to allow sufficient flexibility for the snap ring 68 to be engaged and disengaged from within the snap ring groove 54.

Referring to FIG. 6 (and Detail B drawing associated therewith), it can be seen that the snap ring groove 54 may be defined with various design characteristics and features. For example, in the illustrated embodiment, the ring groove 54 has an axial length 66 defined by side walls 56. The groove 54 may include a flat bottom portion 58 that is defined between rounded corners 60, with the corners having a design radius. For example, in the illustrated embodiment, the corner radius is R=1 mm and the flat bottom portion 58 of the ring groove 54 is raised above the corners 60 by a height 62 (0.2 mm in the illustrated embodiment). Still referring to Detail B, the ring groove 54 has a design radial depth 64, which in the illustrated embodiment is 9 mm, as compared to the axial length 66 of 9.3 mm.

It should be readily appreciated that the design dimensions of the ring groove 54 are not limited, and may be readily designed to achieve any desired axial load characteristic for the snap ring 68 and ring groove 54 combination, in accordance with aspects of the invention.

Still referring to FIG. 6, in particular embodiments, the retention assembly 50 may include a relief groove 82 that is also defined in the outer circumferential surface 52 of the main rotor shaft 20. The relief groove 82 is axially offset from the ring groove 54 in the direction towards the inner ring 48 (FIG. 4). The relief groove 82 is designed with a radial depth 92 and axial length 90, and has an axial offset distance 94 from the ring groove 54 so as to provide a reduced stress profile at the ring groove 54. In the illustrated embodiment depicted in FIG. 6, the relief groove 82 has a axial length 90 of 30 mm and a radial depth 92 of 10 mm. It may be desired that the relief groove 82 has a greater radial depth 92 then the ring groove 54, as depicted in FIG. 6.

The relief groove 82 includes side walls 84 that, in the illustrated embodiment, are defined by continuously rounded shoulder fillets 86 having a defined radius. For example, in the embodiment of FIG. 6, the shoulder fillets 86 have a radius R=10 mm that corresponds to the radial depth 92 of the relief groove 82.

Still referring to FIG. 6, the offset distance between the ring groove 54 and relief groove 82 may vary and, in the illustrated embodiment, is from 8 mm to 10 mm. With the particular configuration illustrated in FIG. 6 and dimensional parameters set forth therein, the stresses induced at the ring groove 54 in a normal operational state of the main rotor shaft 20 are less than or equal to the stresses at the relief groove 82. In this manner, the snap ring 68 becomes the limiting stress component of the retention assembly 50 rather than the ring groove 54 in which the snap ring is seated.

FIG. 7 is a graph of certain dimensional combinations for the relief groove 82 relative to the ring groove 54 illustrated in FIG. 6. The graph in FIG. 7 displays the bending stress factors associated with each combination. For example, referring to the left-side entry on the graph, the bending stress factor for a snap ring groove 54 alone (without a relief groove) is depicted.

The next entry on the graph depicts the same snap ring groove 54 with a circular cross-sectional relief groove having a 10 mm radius and an offset distance of 8 mm from the snap ring groove 54. With this combination, the stresses at the relief groove and snap ring groove are essentially the same.

The next entry on the graph of FIG. 7 is for a relief groove having a 10 mm radial depth, 30 mm axial length, and an offset distance of 9 mm from the snap ring groove 54. Likewise, the next entry on FIG. 7 has the same type of relief groove configuration, but with an offset axial distance of 8 mm from the snap ring groove 54. This particular entry represents the configuration of FIG. 6, while the previous entry is similar to the embodiment of FIG. 6, but with an increased axial offset distance 94 of 9 mm instead of 8 mm. The next entry in the graph of FIG. 7 is for a similar relief groove configuration having an axial length 90 of 40 mm.

Still referring to the graph in FIG. 7, the next two entries on the graph are for relief grooves having an 8 mm radial depth and 25 mm and 30 mm axial length, respectively, as well as an 8 mm separation distance between the respective grooves.

It can be seen from the graph depicted in FIG. 7 that the relief grooves with the deeper (10 mm radial depth values) are more effective at shielding the snap ring groove from stresses, as compared to the grooves having a lesser (8 mm radial depth). It should be appreciated from the graph that a preferred combination are those that are circled in the graph in that the bending stress factors for the snap ring groove are the least (and thus better shielded) for the stated relief groove dimensions.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A retention assembly for securing a main rotor shaft in a wind turbine relative to a pillow block, comprising:
   a main rotor shaft extending through a pillow block;
   a ring groove defined in an outer circumferential surface of said main rotor shaft axially offset from said pillow block;
   a snap ring engaged within said ring groove;
   wherein said snap ring and said ring groove are designed to achieve a design axial load capacity;
   a relief groove defined in said outer circumferential surface of said main rotor shaft axially offset from said ring groove, said relief groove having a radial depth and defined at an axial distance from said ring groove so as to reduce stresses at said ring groove; and
   wherein said relief groove has a radial depth that is greater than a radial depth of said ring groove and is axially spaced from said ring groove of distance from 8 mm to 10 mm.

2. The retention assembly as in claim 1, wherein said radial depth of said relief groove is between 8 mm to 10 mm.

3. The retention assembly as in claim 2, wherein said relief groove comprises side walls and a flat bottom in the axial direction of said main rotor shaft.

4. The retention assembly as in claim 3, wherein said side walls comprise rounded shoulder fillets from said flat bottom to said outer circumferential surface.

5. The retention assembly as in claim 4, wherein said rounded shoulder fillets have a radius of R=10 mm.

6. The retention assembly as in claim 1, wherein stresses at said ring groove are less than or equal to stresses at said relief groove.

7. The retention assembly as in claim 6, wherein said snap ring is the limiting stress component as compared to said ring groove.

8. The retention assembly as in claim 1 wherein said ring groove comprises a side walls and a flat bottom in the axial direction of said main rotor shaft, said ring groove further comprising rounded corners between said side walls and said flat bottom with a radius such that said flat bottom is raised above said corners.

* * * * *